April 5, 1955  R. R. MUELLER  2,705,451
TOASTERS, AND THE LIKE
Filed April 26, 1952  2 Sheets-Sheet 1
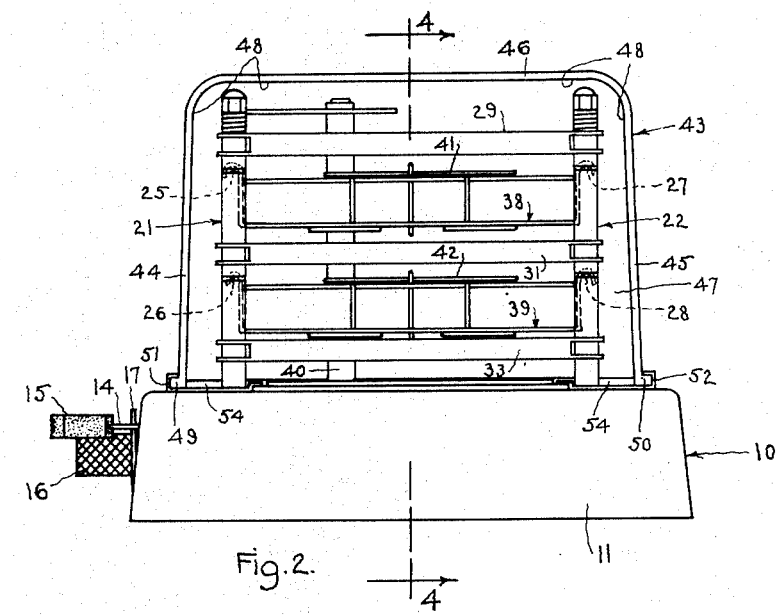
Fig. 2.
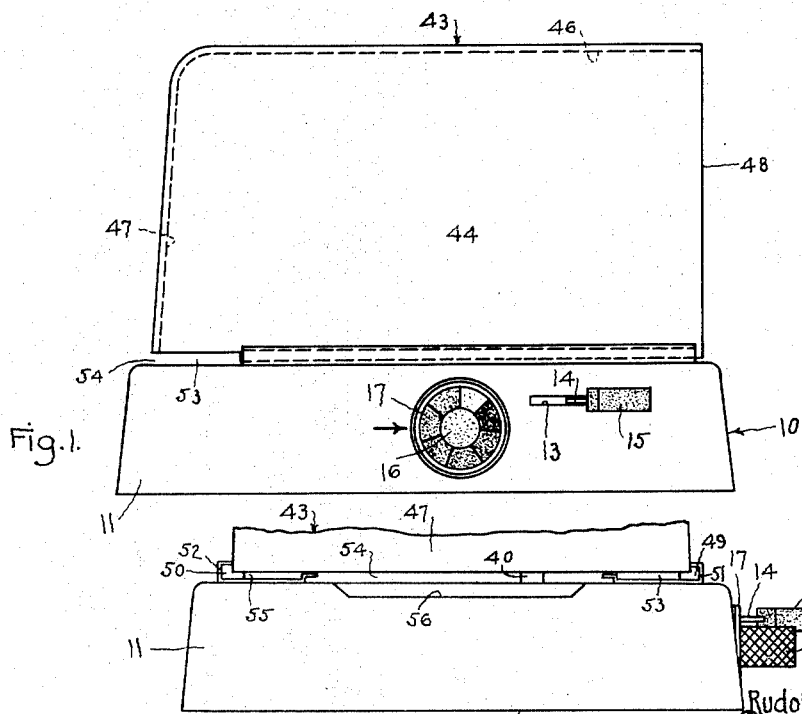
Fig. 1.
Fig. 3.
Inventor:
Rudolph Robert Mueller,
by April 5, 1955  R. R. MUELLER  2,705,451
TOASTERS, AND THE LIKE
Filed April 26, 1952  2 Sheets-Sheet 2

Inventor:
Rudolph Robert Mueller,

United States Patent Office 2,705,451
Patented Apr. 5, 1955

2,705,451

TOASTERS, AND THE LIKE

Rudolph Robert Mueller, Clarksville, Ohio

Application April 26, 1952, Serial No. 284,508

3 Claims. (Cl. 99—341)

This invention relates to improvements in toasters, and the like, and to the operation thereof, and to an improved method of producing toast. Broadly considered, therefore, the present invention relates both to improvements in the toasters themselves, and also to the method of toast production whereby a very superior quality of toast product is produced.

This application is a continuation-in-part of my copending application for patent on Timer for Toasters, and the like, Serial No. 67,938, December 29, 1948, now Patent No. 2,605,832. Certain of the features herein disclosed are also shown in my co-pending application Serial No. 787,652, filed November 24, 1947, now Letters Patent of the United States, No. 2,595,283, dated May 6, 1952.

Generally speaking the present application concerns itself with the design and construction of a form of toaster which is provided with a wholly transparent enclosure through which the toasting operations may be continuously viewed during the toasting operation, and without interference with or impairment of the transparency of such enclosure by reason of deposition or condensation of condensates on the interior surface of such transparent enclosure. Such condensates and such impairment of the quality of transparency of the enclosure have heretofore been such as to destroy any benefit of transparency otherwise intended to be secured in the toaster enclosure, so that, although previous attempts have been made to produce what may have been intended to be "transparent enclosure" toasters, such attempts have failed of their objective due to condensation of materials on the interior surfaces of any transparent enclosure portions. I have discovered the causes of such failures, and I have also discovered the means whereby such condensates may be avoided, with the result that when using the features of my improvements herein and previously disclosed fully transparent enclosure toasters may and have been produced, retaining their quality of transparency during the entire toasting operation or series of operations. In order that my discoveries and my improvements may be fully understood I shall explain some of the underlying principles which are involved in the toasting process and the toasting operation, and shall then show how I have corrected for previous imperfections in toasters, which imperfections have prevented the attainment of the objective of transparency in the toaster enclosure during the toasting operations. At the same time I shall show how the reduction of these discoveries to practice in my improved toasters has also enabled me to produce a greatly superior quality of product, namely, a greatly superior quality of toast. This superiority, I have discovered, is also available when producing toast of various kinds, and of various degrees of darkness, and from various qualities of bread or raw material, and whether the slices be toasted "dry" or "uncoated" or they be coated with butter or cheese or other spread material.

The conversion of a slice of bread into the desired slice of toast requires not only that such bread slice be subjected to such treatment as will result in production of the desired "toasted" finishes on the slice surfaces, but also requires that during such operation the conditions of heat and other treatment be such as to ensure production of a desired quality of the interior of the slice. Moisture contained within the body of the slice during this operation will be subjected to a vaporizing temperature, so that in the absence of proper treatment and proper provision for the removal of such vaporized moisture, and removal thereof during the proper stages of the toasting operation, the quality of the resulting product will be greatly impaired as compared to that quality which might have been attained, had the conditions been proper at all stages of the toasting operation. When the conditions are not proper for such moisture removal, such contained moisture, contained within the body of each slice, will recondense within such slice, having not been allowed to gain free exit from the slice body during the toasting operation. Such recondensed moisture will then give to the final product a soggy or doughy quality instead of a fine flaky quality for the interior portion of the slice, and contained between the properly toasted surfaces thereof. This entrapped moisture includes not only the free moisture of the slice thus treated, but also additional moisture released chemically during the heating operation, and due to chemical changes thus produced within the material being treated. Therefore it is not possible to produce a high quality of the toast unless proper provision is made for release and disposition of all the vaporized moisture as and during the process of its vaporization, with further provision for carrying all such moisture or vapor completely away from the slice at all times during the toasting operation.

At this point I may mention that toast produced by conventional forms of toaster, and according to generally used toasting methods as presently being practiced, does not have the flaky quality to which I have referred in the previous paragraph, but on the contrary it possesses a rather doughy and even pasty quality such that the consumer of such toast must tear each bite from the body of the slice during the eating process. On the contrary, toast produced according to my presently to be disclosed process and method, and by toasters embodying the features herein to be disclosed, possesses a highly desirable "flaky" quality, such that it is possible for the consumer to bite directly through the slice, with severance of a clean cut bite from the slice, and completely without need of any such "tearing" operation as I have previously referred to.

The conditions already stated as affecting the quality of the toast product are applicable generally throughout the entire range of toasting conditions which are needed for production of various shades or degrees of darkness of the toast, whether such shade be of "light" or "medium" or "dark," or any intermediate shade desired by the consumer. Said conditions are also applicable generally whether the toast product be what is generally referred to as "ordinary" toast or "Melba" toast, and of shade of darkness throughout the range of such shades as well understood and used in the culinary arts. The above statements are true since, if provision is not made for proper and full and continuous removal of the vaporized moisture and other material during the toasting operation, any such vaporized material will necessarily recondense within the body of the slice, and produce the undesirable quality to which I have already referred. On the contrary, and by like reasoning, when the conditions are such as to provide for and to ensure complete and continuous removal of the vaporized material from the presence of the slice during the toasting operation, according to my present disclosures, it is possible to produce my greatly improved quality of toast product, whether it be "ordinary" toast or "Melba" toast, and of any of the desired degrees of darkness customarily used.

The vaporized materials comprise those of two categories, namely, the body moisture of the slice itself, including water vapor produced by any chemical changes induced by the heat application; and also include vapors produced from such surface applied materials as butter, cheese, and/or other spreads which may have been applied to the slice prior to or during the toasting operation. These latter vapors are generally much heavier than water vapor and have widely different dew points. Nevertheless in order to produce the desired quality of toast and according to my presently disclosed principles and discoveries, all such vaporized materials must be continuously removed from the presence of the toasting slice as and during the toasting operation.

The removal of the vaporized materials from the presence of the toasting slices during the toasting operation requires that such vaporized materials shall be disposed of away from such slices. Since it is a further important feature and object of my present invention to produce a toaster having a fully transparent enclosure it is now necessary to consider the effect of such vapors on the transparency of such enclosure during the toasting operations. I contemplate the provision of an enclosure for the toasting slices and for the necessary slice supports and the heating elements and other accessory parts, which enclosure shall be of transparent material; but the quality of transparency of such enclosure must also be maintained or retained at all times during the toasting operation if that quality is to be of value and use to enable the operator to observe the toasting operations as they occur. Any vaporized materials carried from the presence of the toasting slices will tend to condense on the surfaces of such enclosure if such surfaces be of temperature below the dew point then existing within the enclosure, and any such condensation would of itself either completely destory the quality of transparency of the enclosure or seriously impair that quality by "fogging" or the like. I have discovered the means and the constructions of the toaster which enable me to carry the vaporized materials completely away from the presence of the toasting slices as fast as produced, and also enable me to ensure complete removal of such vaporized materials from the interior of the enclosure as fast as they are produced during the toasting operation. By use of these discoveries and the means and constructions which I shall hereinafter disclose I have found that it is possible not only to ensure production of the superior quality of toast product to which I have already referred, but also to completely avoid condensation of the produced vapors on the interior surfaces of the transparent material enclosure, so that said enclosure retains its quality of complete transparency at all times during the toasting operations. I shall now refer to these constructions, and to these means and shall show how they ensure the desired results.

The slices are supported in horizontal position during the toasting operation; and when more than one slice is provided for, the several slices are supported, one above the other and in horizontal positions, but with interspaces between the successive slices. The slice supports are accommodated within these interspaces, and the necessary heating elements for toasting the proximate slice surfaces which face each other are also accommodated within these interspaces. Suitable additional heating elements are also provided below the bottom slice and above the top slice for toasting the proximate slice surfaces. Thus it is so far evident that I have provided a horizontal slice toaster with the necessary heating elements, also located in horizontal placements, with all of these parts in vertical spacing with respect to each other. I then also provide an enclosure of more or less rectangular form, comprising a top, side walls, and a back, with the bottom edges of the side walls and back either in engagement with or close to the top surface of a suitable base section whereby the structures are supported. The front wall of this enclosure is completely eliminated, and thus the enclosure is completely open from side to side, and from bottom to top at the front of the enclosure. This opening is also of size somewhat greater, in width, than the widths of the slices to be accommodated, so that said slices may be introduced into toasting position through said opening while they lie in horizontal positions; and likewise the toasted slices are afterwards delivered or removed through this same opening.

When the heating elements are brought to toasting temperature by resistance effects of the currents flowed through said heating elements, there will be produced a current of air entering through the full width of the lower portion of this fully open front of the enclosure; and the current of entering air will find its way in devious travel through the interior of the enclosure and around the slices, rising to the upper portions of the enclosure, and finally flowing out from the upper portion of the open front of the enclosure. Such outflow will also be in a board stream or current extending the full width of the opening. Of course such flow stream will be produced by reason of the difference of temperature inside and outside of the enclosure, and by reason of the natural tendency of the heated air to rise within the enclosure.

Now the horizontally located slice or slices within the body of the enclosure will provide one or more baffles, horizontally placed within the enclosure, and of less width than the interior of the enclosure, and extending rearwardly within the enclosure, but terminating in advance of the rear wall of the enclosure. These baffles will interfere with and will interrupt the flow of the induced stream previously explained, so that said stream will suffer more or less eddying and/or turbulence within the enclosure, and around the several slices. The natural tendency will then be for this stream to work towards the sides of the slices and move up past these slice sides to the upper portion of the enclosure, working around again so that in the upper portion of the enclosure the stream will find its way to the open front and will be delivered out from the enclosure. However, such uncontrolled flow will not ensure good flow of the stream completely to the rear portion of the enclosure, so that a more or less serious pocket will be produced in that rear portion of the enclosure, especially in the upper rear corner portion of the enclosure. Accordingly it will be found that the effects of the flowing stream will be non-uniform throughout the enclosure interior, with consequent deleterious effects.

In order to ensure such a sufficient volume of the stream of air flowing through the interior of the enclosure as will completely remove the vapors as fast as they are generated, and hold the relative "humidity" of the vapors carried by the air stream to a point such that no condensation shall occur on the inside surfaces of the enclosure, I have found that the front opening of the enclosure should be of the full width of the enclosure and its full height from bottom to top. Also that there shall not be any cross members extending across said full opening, as any such cross members produce an interference with the flow of the air stream greatly exceeding in amount an interference which would be proportionate to the reduction of the area of the opening produced by such cross members. Therefore, I have found that such front of the enclosure should be fully open and unobstructed by any such cross members.

In order to still further ensure complete elimination of all vapors as fast as they are generated, and to hold the relative "humidity" below that at which any deposition of condensate would occur, I have found that provision should be made for admission of air into the lower rear portion of the enclosure, preferably close to the bottom of the enclosure, that is, just above or on a level with the top surface of the base section on which the enclosure itself is carried. Such provision for ingress of such additional air into the main air-stream is also preferably so made that such additional air enters into the central portion of the air-stream (measured across the width of the enclosure), so that such additional air will produce its action equally at both sides of the main air-stream. For this purpose I have provided an opening just beneath the lower edge of the rear wall of the enclosure, and extending for substantially one-half the width of the enclosure, such opening being relatively thin vertically and comprising substantially three to five percent of the area of the front opening of the enclosure. Additionally I have also found it desirable to provide a thin opening between the lower edge of the rear wall of the enclosure and the top face of the base section, at both sides of said central opening previously referred to, and extending around the side portions of the enclosure a short distance on each side of the enclosure. This supplemental thin opening serves to permit ingress of additional air into those portions of the air-stream lying near the rear side portions of the enclosure. All such supplemental so-introduced air, serves to mix with the main air-stream near the rear lower portions of the enclosure, and to thus augment the total volume of air being carried by the stream. Such augmentation is produced where most needed to counteract the "pocketing" effects previously referred to, and thus to ensure good and even flow of the air-stream around all portions of the toasting slices, including those portions which lie to the rear portion of the enclosure and also those portions lying close to the side walls of the enclosure.

The effect of such introduction of supplemental air into the main stream at the locations just referred to is to set up a turbulence factor in a portion of the atmosphere contained within the enclosure where the contained atmosphere is otherwise naturally convective. The entrance of this supplemental air into the main stream is to set up turbulence at locations where such effect is most needed thus further increasing the ability of the stream to absorb the vapors being produced and delivered in the rear portions of the enclosure. It may be considered that these rear openings constitute an air accelerating vent, providing the accelerating effect where most needed.

All of the air stream, including such supplementarily introduced air, will then flow towards the top of the enclosure and move towards the front opening, and will be delivered from the interior of the enclosure through the full width and upper portion of the front opening, carrying with it all vapors, and holding down the relative "humidity" of the interior of the enclosure to a point below the dew point of such vapors. This will be true also in those portions of the stream which come into contact with the interior surfaces of the enclosure. I have thus found over extended periods of tests, and many hundreds of tests that no deposition of condensate will occur during the toasting operations, and that the enclosure will remain clear and transparent at all times. There will be no "fogging" or other interference with the desired transparency of the enclosure.

I have also found that the transparency of the enclosure is not impaired even when using slices which have been coated with butter, or cheese, or other slice spreads which give off heavy vapors.

By way of illustration of one embodiment of toaster which will operate to produce the high quality of toast to which I have already referred, and which toaster is provided with a fully transparent enclosure which retains its transparency at all times during the toasting operation, even when using slices carrying various kinds of spread, such as I have already mentioned, without any deposition of condensate on the interior surfaces of such enclosure, and without production of any "fogging" during toasting operations, reference may be had to the attached drawings, in which, Figure 1 shows a side elevation of a typical toaster embodying the features of my present invention, and capable of producing the toasting operations according to the method or process of operation hereinbefore explained, and which toaster is provided with a fully transparent enclosure which retains its transparency at all times during the toasting operations; and this toaster is of the general form disclosed in my aforesaid copending application, Serial No. 787,652, Letters Patent No. 2,595,283; and the toaster illustrated in this figure also embodies certain features disclosed in my further co-pending application, Serial No. 67,938, for Improvements in Timer for Toasters, filed December 29, 1948, now Patent No. 2,605,832;

Figure 2 shows a front elevation corresponding to Figure 1;

Figure 3 shows a fragmentary rear elevation corresponding to Figures 1 and 2, and this figure shows the form of the supplemental opening or openings through which supplemental air is introduced into the main airstream;

Figure 4:
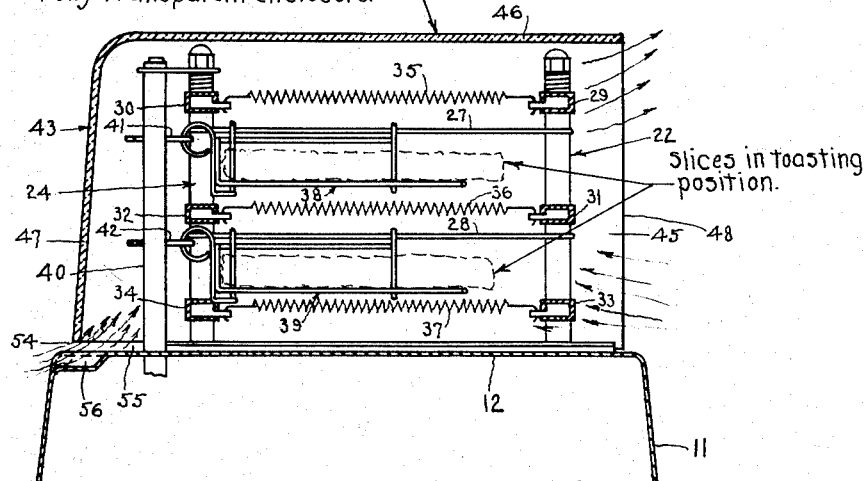
Figure 4 shows a longitudinal vertical section through the toaster, being a section taken on the lines 4—4 of Figures 2 and 5, looking in the directions of the arrows.

In the drawings I have shown a typical toaster construction which embodies structures capable of producing the improved toast product previously referred to herein, and which toaster also includes a fully transparent enclosure which retains its transparent quality at all times during the toasting operation, or during many such operations in succession. The toaster illustrated in these drawings includes slice supports for two slices, one above the other, together with suitable heating elements, one above the upper slice, one below the lower slice, and a third between the two slices. These slice supports are carried by horizontal rails on which they may be moved between the toasting and delivering positions. The transparent enclosure shown in these drawings responds fully to the disclosures hereinbefore stated respecting the enclosure so that it may retain its quality of transparency; and to this end the illustrated enclosure is fully open at its front, being provided with side walls, top, and back.

Said enclosure is shown as comprising a unitary element of transparent glass or like material, capable of resisting the temperatures which are developed on the enclosure during toasting operations, and retaining its transparency at all times, irrespective of such temperature conditions.

The toaster illustrated also includes suitable means to time the toasting process according to the desired degree of darkness to be given to the toasted slices, suitable means to "set" the timer at the beginning of the toasting operation, the toaster being provided with a timer of suitable construction, according to well understood principles in this art, suitable means to retract the slice supports into toasting position as and when the timer is set, and suitable means to deliver the toasted slices at completion of the timed interval. Various of the instrumentalities just above enumerated are well known in the toaster art, and are also shown in full detail in certain of my co-pending applications for Letters Patent of the United States, including those hereinbefore mentioned. Accordingly, I have not deemed it necessary to illustrate all of these instrumentalities herein in full detail, as various of them may be of selected construction and operation, according to the desires of the designer, without impairment of the practice of the toasting process or method herein disclosed, and without impairment of the quality of transparency of the enclosure. I have, however, shown parts of these instrumentalities herein, to sufficient degree to enable the student of this specification to design and produce a toaster or toasters capable of practising the present inventive disclosures.

Figure 5:
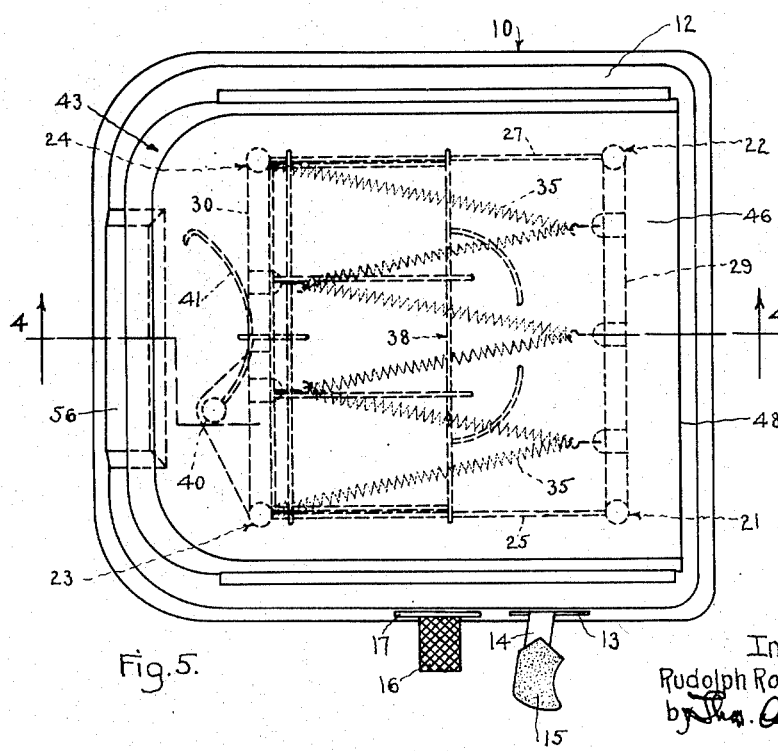
Figure 5 shows a plan view of the toaster shown in Figures 1 to 4, inclusive.

The toaster illustrated includes a suitable base section 10, conveniently formed of sheet metal, and formed into an inverted pan shape of generally rectangular form. This base section includes the downwardly extending flange 11, and the top 12. Largely as a matter of convenience in design and to improve the appearance of the design this base section is rounded on rather broad arcs at its rear corners, as well shown in Figure 5. This is, of course, optional. This base section encloses the timer element, and various other elements required for producing the automatic timing, delivery, and other operations. Such elements may be of the general forms and constructions shown in my co-pending applications, Serial Nos. 787,652, issued May 6, 1952, as Patent No. 2,595,283, and 67,938, filed December 29, 1948, and issued August 5, 1952 as Patent No. 2,605,832, or combinations of the disclosures in said two applications, or other structures as desired. In the arrangement shown in the present drawings I have shown the horizontal slot 13 in one side flange of the base section, and through which slot extends the setting arm 14, having the finger piece 15 on its outer end. This setting arm is moved to the left as far as permitted according to the darkness of toast to be produced, thus setting the parts for commencement of a toasting operation. This setting operation also retracts the slice supports and the slices rearwardly into toasting position, as will presently appear. Upon release of the finger piece the timer will commence counting time against the toasting operation (subject to certain delays which need not be herein described, as they are disclosed in others of my co-pending applications); and after lapse of the interval of toasting time for which the timer has been set the slice supports will be quickly shifted rightward (in Figures 1 and 4) to deliver the toasted slices.

In Figure 1 I have also shown the finger piece or button 16 which is carried by a rock shaft (not shown), and which finger piece and rock shaft may be rotated to various rocked positions within a complete circle of 360 degrees, or less, as designed. This rock shaft carries the projecting disk 17 which presents a circular annulus to the view of the operator. This circular annulus is tinted or colored with various arcuate segments of different degrees of darkness, from light to very dark. The structures supported within the base section include means to arrest the leftward "setting" movement of the arm 14 when the button or finger piece 15 is pressed leftwards, and the extent of leftward setting movement which may be executed by said arm will depend on the set position of rock of this button 16 and its rock shaft. Since the interval required for the timer to effect its return movement of the arm 14 rightwardly to its initial or starting position depends on the extent of setting movement leftwardly at the time of effecting such setting, it is evident that the toasting interval is determined by the extent of such initial leftward setting movement. That extent of movement is determined by the rotated or rocked position of the button 16, and as indicated by the rotated position of the disk 17 with its darkness indications. Accordingly I contemplate the presence and the use, if desired, of suitable means to effect controlled timing of the toasting interval, in carring into effect my improved toasting process or method. Of course, if desired, such controlled timing might be eliminated without discarding the use and practice of my improved toasting process and method. I may mention, however, that included in the base section 11, and as shown in my aforesaid co-pending applications, there is suitable switch means to effect control of the current delivery to the heating elements, presently to be described. Such switching means includes means to institute current flow after or coincidentally with the "setting" operation, so as to institute the heating actions, and for cutting off such current flow when the timed interval has been completed, and at the time of, or concurrently with the slice delivery operations, also to be described presently herein.

Extending upwardly from the base section top, and secured to said top, are the four vertical posts 21, 22, 23 and 24, which constitute portions of the rack structure or the structures which carry the slice supports and the heating elements, presently to be described. One satisfactory construction of these parts is shown in said co-pending application, Serial No. 787,652, so I do not deem it necessary to describe the same in detail herein. However, I here mention that these posts and the elements which they carry, are so arranged that horizontal pairs of rails, 25—27 and 26—28 are provided and are supported by said posts. These rails comprise the two pairs, one above the other as shown. The upper pair 25—27 of rails are located in horizontal planar alignment and support the upper slice support or carrier; and the lower pair 26—28 of said rails are also located in horizontal planar alignment and support the lower slice support or carrier. Conveniently these rails are formed of stiff wire having a rather bright finish so that the slice supports or carriers may slide freely back and forth on said rails. These rails extend from front to back of the structure, as shown.

Extending across this rack structure there are also the supporting bars 29—30, 31—32, and 33—34. These bars are also horizontal, and are located in horizontal planar alignments; and examination of the figures will show that these pairs of horizontally planar aligned bars are located, the bars 29—30 above the locations of the rails 25—27, the bars 31—32 between the pairs of rails 25—27 and 26—28, and the bars 33—34 below the rails 26—28. These pairs of bars are for supporting, by suitable insulators or the like, the three heating elements 35, 36 and 37. These heating elements comprise suitable resistance wires extended from back to front, and backwardly again, in a number of passes for each heating element, as shown. The total heating capacity of each heating element is a matter of ready determination, and I need not here describe the same in detail. Generally, however, the several heating elements are formed of spiralled resistance wire, as shown, and the number of convolutions of spiral contained in each heating element, and considering the size of said wire and the current which it carries, will determine the heat delivery of such heating element. Generally, also the several heating elements are connected in series connection.

The heating effects and the toasting effects produced by these heating elements will also depend on the distances which said heating elements are spaced from the slice surfaces, the radiant heat from the interior of the enclosure, and on various other factors. I have, in said co-pending application, Serial No. 787,652, and elsewhere, shown how, by means of the structures already described herein, it is possible to readily adjust the heating effects of these heating elements to produce the desired toasting effects on all of the slice surfaces.

There are also shown the two slice supports or carriers 38 and 39. Each of these is conveniently formed of wire elements of sufficient stiffness to produce the desired rigidity of the carrier, but still of wires small enough to produce a carrier which, while supporting the slice, produces substantially no interference with the free access of the heat to all portions of the slice surface. Each of these carriers is also provided with lateral or side slice supports, and with a rear slice support, these all combining to retain the slice properly in place on the carrier during carrier movements, but the front of each carrier is left open, so that the slices may be easily introduced at such front openings of the carriers, and so that at conclusion of the toasting operations the slices may be readily removed from or ejected from the respective carriers. These operations are also fully disclosed in my co-pending applications already referred to, and elsewhere.

The carriers are provided with side eyelets which ride on the proximate rails, already referred to, and the proportions of the rail lengths as compared to the locations and spacings of these eyelets are such as to provide for the needed amounts of carrier movements back and forth with respect to the rack structure.

Extending vertically in the rear portion of the structure, and journalled in the top of the base section, is the vertical rock shaft 40. This rock shaft is suitably connected to and is controlled by the timer and other elements contained in the base section, and connected to the setting arm and the button or finger piece 15, so that during the setting operation of the timer this rock shaft is given substantially a 90 degree rock counterclockwise when viewed as in Figure 5, that is, when looking down on the structure. Means are also provided for spring retracting this rock shaft suddenly in clockwise rocking movement at conclusion of the timed operation. Means are also provided for latching this rock shaft in its counterclockwise rocked position, against the urging of such spring, from the time the setting operation has been completed until the timing operation is completed, and for then suddenly releasing such latching means to permit the spring to produce such sudden release of the rock shaft under spring urge for the return movement.

This rock shaft also carries the cam shaped arms 41 and 42 behind the slice carriers. These arms are curved towards the rear, and each such arm is connected to the corresponding slice carrier's rear portion, such rear portion being provided with an eyelet which engages the corresponding arm. This arrangement is such that the back and forth movements of the carriers are determined by and correspond with the arm movements as determined by the rocking movements of the rock shaft.

Various of the parts and elements referred to in the above two paragraphs are fully disclosed in my co-pending applications, and elsewhere, and therefore I do not deem it necessary to disclose the same in full detail herein.

It is to be noted that the rack structures above described are carried by and completely supported by the base section 11, and irrespective of any enclosure over and around such enclosure. I have provided such an enclosure to which I shall now direct my explanation:

This enclosure is designated in its entirety by the numeral 43. It is of generally box like form, or rectangular, but is fully open at its front, between its sides and from top to bottom, and its bottom is also completely open as this enclosure sets on or is supported by the top of the base section 11. Thus this enclosure includes the sides 44 and 45, the top 46, and the back 47. This enclosure structure is formed of fully transparent material such as glass having the needed thermal resisting properties to resist the temperatures and the temperature changes encountered in toasting service; and preferably this transparent material enclosure is also formed as an integral unit, as by casting, moulding, or other suitable operation. I have shown the side walls 44 and 45, and the back 47, of this enclosure as having a fair amount of flare from top to bottom, so that these enclosing elements are not truly vertical but have a considerable slant, as shown in the figures. This will materially assist in the forming operations by which the enclosure is made; and also such flare will affect the horizontal cross-section of the enclosure at various elevations from bottom to top thereof, being of greater cross-section in its lower portions than in its upper portions.

The width of this enclosure is such as to freely accommodate the rack structure between the side walls of the enclosure, and the horizontal dimension of the enclosure from its rear wall to its front opening, designated as 48 is such as to completely enclose the rack structure and the slices carried by the slice carriers or supports when such supports are retracted rearwardly into the toasting position. Thus, during the toasting operation the slice carriers or supports are fully enclosed within the enclosure, that is, they stand completely within the enclosure and back of the front edges of the side walls of said enclosure. It is also noted that the side walls of the enclosure are sufficiently separated from each other to provide some clearance between the sides of the slice carriers or supports (and the rails on which said carriers ride, as well as the side portions of the rack structure) so that vertical passages are ensured between said sides of the rack structure and the slices, and the inside faces of the side walls. It is also noted that a like vertical clearance or passage is provided between the rear portions of the slice carriers or supports, and the slices supported by said carriers, when in their toasting positions, and the interior surface of the rear wall of the enclosure. Therefore such certical passages are afforded both at the sides of the rack structure and the horizontal slices, and the side walls of the enclosure, and between such rack structure and the supported horizontal slices, when in toasting position, and the back of the enclosure. Movements of the air and vapor streams vertically through these passages may and do occur during the toasting operations.

It is here noted that when the slices are retracted fully into toasting position they constitute horizontal barriers or deflectors which largely influence the form and nature of the air stream flowing through the enclosure during the toasting operation; but also that the vertical passages at the sides and at the back of the enclosure permit upward movement of the stream past such horizontal deflectors just referred to. When the heating elements are heated they induce a flow of air generally as follows:

Inwardly through the lower portion of the entire width of the front opening of the enclosure, such inflow existing over a vertical portion of such front opening reaching upwardly for approximately one-fourth the height of such opening, that is, to about the location of the lower slice which is being treated. Such inflowing air as reaches the location of such slice at an elevation beneath the slice must then follow along beneath such slice rearwardly, some of such air spilling laterally to the side passages at the sides of the slice, and there rising past the edges of such lower slice. Some portions of the inflowing air will enter at an elevation such that such portions may move rearwardly over the upper surface of the lower slice; and of this portion of the entering stream, some portions will also be deflected laterally and find their way to the upflowing air streams at the sides of the interior of the enclosure. Finally, portions of the inflowing stream will find their way rearwardly far enough to work past the rear edge of the lower slice and will then rise between that slice and the inside surface of the rear wall of the enclosure.

The portions of the stream which move between the two slices, that is, between the top face of the lower slice and the bottom face of the upper slice, will be subjected to heating effects of the heating element located in that section of the structure; and the portions of the stream which moved beneath the lower slice will be heated by the lower heating element. The heated portions of the stream flowing between the two slices will spread out, some portions thereof working laterally and joining the stream portions flowing up at the sides of the structure, and continuing upward movement either past the upper slice or working forwardly again towards the front opening, such movements either laterally or also forwardly being induced by the presence of the upper slice which blocks direct movement upwardly through its body. Some small portions of this stream which moves between the two slices may reach as far back as the vertical passage between the rear edges of the slices and the interior surface of the back wall of the enclosure, and rise past the rear edge of the upper slice. Generally the amount of volume of such portion of the stream will be small.

Those portions of the stream which rise at the sides of the upper slice (and past the rear of such slice) will move generally forwardly towards the upper portion of the front opening, but these portions will not develop a very large stream mass over the upper face of the upper slice.

It will thus be seen that generally the movement of the stream is inwardly through the lower portion of the front opening, (approximating one-fourth of the full height of that opening), around the lower slice and between the two slices, and upwardly into the upper portion of the interior of the enclosure, working its way forwardly and being delivered out through the upper portion of the front opening of the enclosure (generally approximately the upper one-fourth of that opening). Such stream flow will carry the air into intimate contact with the various heating elements, so the air stream will be raised in temperature to a high degree. The flowage of this stream over and around the slice surfaces will ensure rapid and continuous removal of the vaporized materials, whether water vapor or the vapors of other materials, such as butter and/or other spreads, so that continuous and free exit of such vapors from the vicinity of the slices during the toasting operations, will be ensured. Thus all materials vaporized from the slices will be so removed as to completely avoid any recondensation of such materials into or onto the slices. For this reason, among others, I am able to produce toast product of the high quality to which I have referred previously herein.

It is also to be noted that since the stream flowing past and over the heating elements, at locations where such stream is confined, by the slice surfaces, closely to the heating elements, the air and vapors of such stream portions will be continuously held at a high temperature, so that such vapors are at all times well above the dew points of the vaporized materials. By reason of this fact the re-condensation of such vapor materials is prevented, and said vapor materials are retained in their vapor phase at all times until the stream is finally exited from the enclosure, through the upper portion of the full front opening thereof.

In order to ensure against any condensation of these vapors on the inside surfaces of the enclosure, which condensation would "fog" the otherwise transparent enclosure, producing blurring or even completely preventing vision through such transparent enclosure, and to ensure that said transparent enclosure shall retain its complete transparency during the entire toasting operation, the arrangement, the means, must be such as to ensure complete removal of all vapors at all times during the toasting process, holding said vapors fully in the vapor phase from the time they are produced until they have been carried completely out of and clear of the enclosure. This result can be attained only if the stream which carries such vapors is of magnitude sufficient to hold said vapors at a low relative humidity, and well below their "dew point" even when coming into contact with the somewhat cooler surfaces of the enclosure. This result can be attained by ensuring that the magnitude of the body of the stream shall be so large that the quantity of vapor materials released at any time during the toasting process shall not be sufficient to raise the said relative humidity to or close to the "saturation point" for such vaporous materials. I have found by extensive experience, and by many hundreds of tests with various arrangements of the enclosure and with variation of the size of the front opening thereof, that when the said front opening comprises substantially the full dimensions of the front of the enclosure, and without any obstructions across said opening, in the forms of cross bars, or flanges, either across the body of such opening, or at its upper and/or lower edges, such a volume of the stream is induced as will produce and ensure complete freedom from any re-condensation of the vapors or any of them, thus ensuring the retention of the complete transparency of the enclosure at all times during the toasting operation.

In connection with the foregoing explanation I also wish to point out that I have discovered that the desired result is prevented even when a partial closure for said front opening is provided, which enclosure is provided with louvres or the like, intended to provide for the necessary freedom of ingress and egress of the stream into and from the interior of the enclosure. It is also especially to be noted that any obstructions across either the lower or the upper portions of the front opening, such as flanges extending upwardly from the top of the base section, or downwardly from the top of the enclosure, seriously impair that freedom of stream movement which I have found to be necessary to ensure complete avoidance of the condensations on the interior surface of the enclosure. Such flanges apparently produce a deleterious effect greatly beyond that which might be expected, based on a comparison of the areas of front opening obstructed by such flanges in comparison to the total cross-sectional area of the enclosure at its front end.

I shall presently also disclose additional means to ensure complete freedom of the enclosure from any re-condensation of such vapor materials, as well as also ensuring production of the high degree of excellence of the product itself.

At this point I call attention to the fact that the enclosure illustrated in the drawings is of a width substantially the same as the horizontal dimension of the interior of such enclosure, measured from the front edges of the side walls, back substantially to the rear edges of the slices when they are retracted into toasting position. Accordingly, the proportions of such enclosure are such as to avoid a very long travel of the stream rearwardly within the enclosure, even for those portions of the stream which act on the rear portions of the slices. This is in accordance with good practice in reference to the ratios of these dimensions.

It is to be noted that the rearward flow of the stream must, at some portion or zone of the interior of the enclosure, be converted into a returning or forward flow, and that the rearward flow occurs in the lower portions of the enclosure, while such forward flow occurs in the upper portions of the enclosure. The reversals of movement, while largely controlled and affected by the presence of the horizontal slices (during the toasting operation) will, nevertheless introduce "pockets" in the rear portion of the enclosure, in which pockets there will be more or less dead bodies of air (and vapor). These pockets will naturally occur in the lower and upper rear portions of the enclosure, in the absence of special provision to avoid their occurrence, or to counteract their effects. I have made provision to avoid the formation of these pockets, and to counteract their effects, which provision I shall now explain:

The lower portions of the enclosure are supported by the top of the base section, as I have already pointed out. To this end I have shown the lower edge portions of the side walls 44 and 45 as being provided with the outwardly extending ribs or tongues 49 and 50. These ribs come into supporting contact with the top of the base section, and they thus establish the needed supports for the enclosure on the base section. I have also provided the grooves 51 and 52 carried by the base section, and into which these tongues may be slid, so as to attach the lower edge portions of the side walls of the enclosure to the base section by a sliding operation, sliding the enclosure forwardly over the top surface of the base section, and thus bringing the side walls of the enclosure into proper positions opposite to the sides of the rack structure. This operation is possible due to the fact that the front opening of the enclosure is of full width and full height, thus being large enough to accommodate the size of the rack structure during the assembling operation.

When the enclosure is thus assembled onto the base section it will be seen that a substantially air tight connection is established between the lower edges of the sides 44 and 45 of the enclosure, and the base section, through such front to rear dimension as may correspond to the front-rear lengths of said ribs. However, examination of Figures 1 and 5 will show that said ribs extend rearwardly only for about 85% of the rearward dimension; or to put the matter another way, said ribs extend rearwardly to a location substantially as far as the rear edge portions of the slices which are to be treated. Examination of Figures 1, 3 and 4, will also show that rearwardly of said ribs the lower edge of the side walls, and the lower edge of the back of the enclosure, are all raised slightly above the top surface of the base section, so as to provide a narrow opening, 53—54—55, extending rearwardly from the rib at one side of the enclosure and around the rear corner at that side, then across the rear of the enclosure, then around the rear corner at the other side, and then forwardly along the other side of the enclosure to the rear end of the rib at that side. This narrow opening is of the order of $3/16$ inch in height, but, this dimension, combined with the length of such opening, of about 10 inches, gives an elongated opening of the order of 2 square inches full opening, and distributed across the entire back of the lower edge of the enclosure, and forwardly for some distance at both sides, far enough in fact, to reach approximately to the rear ends of the ribs previously referred to.

Since this long narrow opening exists at that portion of the structure where the stream is curving upwardly and rising within the enclosure it follows that a natural induced draft condition will exist at the location of this opening, ensuring the inflow of a material volume of air into the interior of the enclosure all along that portion where the introduction of such air will most greatly benefit the movements of the stream on the interior of the enclosure. It also follows that this added air will break up the pockets which would otherwise form in the lower and upper rear portions of the enclosure, so that even in said portions of the enclosure the stream will be corrected, and a full flow of the stream will be there ensured.

Experience has shown the desirability of making provision for induction of an increased amount of air at and adjacent to the central portion of the lower edge of the back wall of the enclosure, over and above the amount of such air induced through this opening, 53—54—55. Accordingly, I have also provided an enlargement of that opening 53—54—55 by depressing the top face of the rear central portion of the base section, as shown at 56 in Figures 3, 4 and 5. This depression reaches from the rear edge of the top of the base section forwardly far enough to underlie the edge of the back 47 of the enclosure, and then forwardly far enough to carry well within the enclosure itself, as well shown in Figures 4 and 5. This depression thus extends forwardly far enough to ensure delivery of induced air into the body of the stream curving upwardly directly in advance of the rear wall 47. This supplemental opening is shown as being of the order of $1/4$ inch deep and $3\frac{3}{4}$ inches wide, giving a cross section area of substantially 1 square inch in addition to the cross sectional area of the narrow opening 53—54—55, previously described.

These supplemental openings serve to ensure such an induced inflow of air, at the correct locations, as to completely prevent the formation of the air pockets previously referred to. These openings may be considered as air accelerating vents, since they not only prevent the formation of the pockets, but they also materially accelerate the stream flow within the enclosure. This additionally introduced air will also ensure a full stream mass in those portions where, due to the reversal of stream direction, there would otherwise be a material reduction of the stream mass.

As illustrative of one embodiment of my present invention which has given consistent excellent results in accordance with the features and principles heretofore disclosed herein, I may mention the toaster shown in the attached drawings. This toaster is provided with two slice carriers, for production of two toast slices. The enclosure is substantially $6\frac{3}{4}$ inches wide internally, substantially $4\frac{3}{4}$ inches high internally, and substantially $8\frac{1}{4}$ inches from the rear wall to the plane of the front edges of the side walls and top, measured internally. The heating elements are designed to consumption of substantially 960 watts distributed among the three heating elements in manner to give uniform and equal toasting effects on all four of the slice surfaces. I have previously stated by way of example, suitable dimensions for the narrow elongated opening 53—54—55, and for the depressed air inlet opening, 56. The transparent enclosure is formed of glass having a thickness of substantially 0.15 inch. All of these dimensions are stated merely by way of example, and as illustrative of one embodiment of my invention which has completely fulfilled all of the requirements hereinbefore stated, and not by way of limitation, except as I may limit myself in the claims to follow.

I claim:

1. In a toaster, the combination of a pair of horizontal slice carriers for slices to be toasted, said slice carriers being located one above the other and separated from each other to provide an intermediate horizontal planar space, an open conductor heating element comprising a series of passes of heating conductor located within a horizontal plane in said intermediate horizontal planar space, an upper and a lower open conductor heating element, said upper heating element being located within a horizontal plane above the upper slice carrier and the lower heating element being located within a horizontal plane below the lower slice carrier, a base section having a substantially horizontal top surface, means to support both of the slice carriers above said base section top surface, said means including vertically extending elements secured to the base section and means to support both slice carriers from said vertically extending elements, means to support the heating elements including means to connect said heating elements to said vertically extending elements, together with an enclosure for said slice carriers and the slices carried thereby, said heating elements, and said supporting means, said enclosure comprising a substantially rectangular element having side walls, a back, and a top, and said enclosure being substantially completely open at its front for the full width between the side walls and for the full hight of said side walls, the front edges of the side walls and the top of the enclosure lying substantially within a common vertical plane, said enclosure having a lateral internal dimension greater than the width of the slice carriers and said supporting means, and having a dimension from the plane of the front edges of the side walls and top to the inner surface of the back wall of the enclosure greater than the dimension of said supporting means and the slices carried by said slice carriers, means to support the lower edge portions of the side walls of said enclosure on the top surface of the base section with the slice carriers, the heating elements, and the said supporting means located centrally between the side walls of the enclosure, the lower edge of the back of the enclosure being spaced above the top surface of the base section to thereby provide a narrow elongated opening for ingress of air through such opening directly into the rear lower portion of the enclosure, and means to deliver heating current to the heating elements.

2. Means as specified in claim 1, wherein said enclosure comprises a unitary element formed of transparent material.

3. Means as specified in claim 1, wherein the top surface of the base section is depressed at a location beneath the central portion of the back of the enclosure to thereby provide the opening for ingress of air to the interior of the enclosure at a location close to the back of the enclosure and centrally of the lower portion of the back portion of the enclosed space.

References Cited in the file of this patent

UNITED STATES PATENTS

| | | |
|---|---|---|
| 1,522,818 | Grouleff et al. | Jan. 13, 1925 |
| 1,543,362 | Boletins | June 23, 1925 |
| 1,599,560 | Engott | Sept. 14, 1926 |
| 1,696,613 | Shroyer | Dec. 25, 1928 |
| 1,937,562 | Ginder | Dec. 5, 1933 |
| 1,963,409 | Johnson | June 19, 1934 |
| 2,262,498 | Holm-Hansen | Nov. 11, 1941 |
| 2,429,736 | Wales | Oct. 28, 1947 |
| 2,438,470 | Wilson | Mar. 23, 1948 |
| 2,447,641 | Dunham | Aug. 24, 1948 |
| 2,454,370 | Gaspe Beaubien | Nov. 23, 1948 |
| 2,488,215 | Mayne | Nov. 15, 1949 |